(12) United States Patent
Kalmstrom (10) Patent No.: US 9,277,041 B2
(45) Date of Patent: Mar. 1, 2016

(54) PHONE NUMBER RECOGNITION

(75) Inventor: Peter A. Kalmstrom, Redmond, WA (US)

(73) Assignee: Skype, Dublin (IE)

( * ) Notice: Subject to any disclaimer, the term of this patent is extended or adjusted under 35 U.S.C. 154(b) by 0 days.

(21) Appl. No.: 13/414,523

(22) Filed: Mar. 7, 2012

(65) Prior Publication Data

US 2013/0064359 A1 Mar. 14, 2013

Related U.S. Application Data

(63) Continuation of application No. 11/416,378, filed on May 2, 2006.

(51) Int. Cl.
*H04M 1/57* (2006.01)
*G06F 17/24* (2006.01)
*G06F 17/27* (2006.01)
*H04M 7/00* (2006.01)

(52) U.S. Cl.
CPC .............. *H04M 1/57* (2013.01); *G06F 17/241* (2013.01); *G06F 17/271* (2013.01); *H04M 7/003* (2013.01)

(58) Field of Classification Search
USPC ..................................... 379/93.18
See application file for complete search history.

(56) References Cited

U.S. PATENT DOCUMENTS

| | | | |
|---|---|---|---|
| 5,077,804 A * | 12/1991 | Richard | ........................ 382/138 |
| 5,455,858 A | 10/1995 | Lin | |
| 5,917,904 A | 6/1999 | Theis | |
| 6,169,791 B1 | 1/2001 | Pokress et al. | |
| 6,453,024 B1 | 9/2002 | Baker et al. | |
| 6,477,247 B1 | 11/2002 | Burg et al. | |
| 6,928,150 B2 | 8/2005 | Johnston | |
| 7,028,027 B1 | 4/2006 | Zha et al. | |
| 7,162,025 B2 * | 1/2007 | Schnurr | .................. H04L 12/66 |
| | | | 379/204.01 |
| 7,212,626 B1 | 5/2007 | Kobayashi | |
| 7,317,919 B1 | 1/2008 | Ruf | |
| 7,747,265 B1 | 6/2010 | Ruf | |
| 8,090,092 B2 | 1/2012 | Madanes et al. | |

(Continued)

FOREIGN PATENT DOCUMENTS

| | | |
|---|---|---|
| WO | WO 2005/008524 A1 | 1/2005 |
| WO | WO 2005/009019 A2 | 1/2005 |

(Continued)

OTHER PUBLICATIONS

Notification of Transmittal of the International Search Report and Written Opinion of the International Searching Authority, or the Declaration, PCT/EP2010/055832, Mailing Date: Jul. 26, 2010, 11 pages.
"Advisory Action", U.S. Appl. No. 11/415,992, (Feb. 24, 2011), 2 pages.
"Advisory Action", U.S. Appl. No. 12/584,987, (Dec. 15, 2011), 2 pages.

(Continued)

*Primary Examiner* — Amal Zenati
(74) *Attorney, Agent, or Firm* — Danielle Johnston-Holmes; Micky Minhas; Wolfe-SBMC (57) ABSTRACT

Method and system for recognizing a numeric or alphanumeric sequence of characters in a document, the sequence conforming to predetermined rules and representing user identifiers for identifying users in a communication system include identifying a country of origin of the document, recalling rules relating to the format of the sequence associated with the determined country of origin, searching the document to identify any sequence in the document satisfying the format and returning any such sequence.

20 Claims, 9 Drawing Sheets

(56) References Cited

U.S. PATENT DOCUMENTS

| | | |
|---|---|---|
| 8,635,362 B2 | 1/2014 | Kalmstrom |
| 8,855,294 B2 | 10/2014 | Madanes et al. |
| 2002/0129359 A1 | 9/2002 | Lichner |
| 2003/0112932 A1 | 6/2003 | Johnston |
| 2004/0128144 A1 | 7/2004 | Johnson et al. |
| 2004/0214558 A1 | 10/2004 | Chang et al. |
| 2004/0243939 A1 | 12/2004 | Perepa et al. |
| 2004/0266490 A1 | 12/2004 | Silver |
| 2005/0091274 A1 | 4/2005 | Stanford |
| 2005/0097189 A1 | 5/2005 | Kashi |
| 2006/0105790 A1* | 5/2006 | Jin .................. H04M 1/274566 455/456.6 |
| 2006/0224467 A1 | 10/2006 | Walker et al. |
| 2006/0248456 A1* | 11/2006 | Bender ............... G06F 17/2765 715/210 |
| 2006/0271457 A1 | 11/2006 | Romain et al. |
| 2007/0005439 A1 | 1/2007 | Sidlo et al. |
| 2007/0274510 A1 | 11/2007 | Kalmstrom |
| 2007/0274512 A1 | 11/2007 | Madanes et al. |
| 2008/0081662 A1 | 4/2008 | Strandell et al. |
| 2008/0298561 A1 | 12/2008 | Hwang et al. |
| 2009/0005122 A1 | 1/2009 | Goldfarb |
| 2009/0010401 A1 | 1/2009 | Zazza |
| 2009/0141709 A1 | 6/2009 | Cho et al. |
| 2009/0161661 A1 | 6/2009 | Scharf et al. |
| 2009/0164632 A1 | 6/2009 | Kumar et al. |
| 2009/0201918 A1 | 8/2009 | Cho et al. |
| 2010/0005426 A1 | 1/2010 | Van et al. |
| 2010/0287301 A1 | 11/2010 | Kalmstrom et al. |
| 2012/0128148 A1 | 5/2012 | Madanes |
| 2015/0016601 A1 | 1/2015 | Madanes et al. |

FOREIGN PATENT DOCUMENTS

| | | | |
|---|---|---|---|
| WO | WO 2005/009019 A3 | 1/2005 | |
| WO | WO-2010127992 | 11/2010 | |

OTHER PUBLICATIONS

"Examiner's Answer to Appeal Brief", U.S. Appl. No. 11/416,378, (May 10, 2012), 13 pages.

"Final Office Action", U.S. Appl. No. 11/415,992, (Dec. 17, 2010), 12 pages.

"Final Office Action", U.S. Appl. No. 11/416,378, (Feb. 19, 2010), 24 pages.

"Final Office Action", U.S. Appl. No. 12/584,987, (Oct. 12, 2011), 20 pages.

"Non-Final Office Action", U.S. Appl. No. 11/415,992, (Aug. 26, 2010), 9 pages.

"Non-Final Office Action", U.S. Appl. No. 11/415,992, (Apr. 26, 2010), 8 pages.

"Non-Final Office Action", U.S. Appl. No. 11/416,378, (Feb. 2, 2011), 22 pages.

"Non-Final Office Action", U.S. Appl. No. 11/416,378, (Sep. 1, 2009), 22 pages.

"Non-Final Office Action", U.S. Appl. No. 11/416,378, (Nov. 8, 2011), 26 pages.

"Non-Final Office Action", U.S. Appl. No. 12/584,987, (Apr. 28, 2011), 20 pages.

"Notice of Allowance", U.S. Appl. No. 11/415,992, (Sep. 6, 2011), 5 pages.

"Notice of Allowance", U.S. Appl. No. 12/584,987, Sep. 5, 2013, 20 pages.

"Non-Final Office Action", U.S. Appl. No. 13/301,339, Feb. 5, 2014, 3 pages.

"Notice of Allowance", U.S. Appl. No. 13/301,339, May 28, 2014, 4 pages.

"Non-Final Office Action", U.S. Appl. No. 14/504,388, Jan. 28, 2015, 11 pages.

"Final Office Action", U.S. Appl. No. 14/504,388, May 13, 2015, 5 pages.

"BPAI Decision", U.S. Appl. No. 11/416,378, Jun. 26, 2015, 8 pages.

"Notice of Allowance", U.S. Appl. No. 14/504,388, Nov. 27, 2015, 4 pages.

* cited by examiner

| Country | Prefix | Min Area | Max Area | Min Sub | Max Sub | Remove Zero | Domain |
|---|---|---|---|---|---|---|---|
| Afghanistan | 93 | 2 | 2 | 5 | 6 | True | af |
| Albania | 355 | 1 | 3 | 4 | 6 | True | al |

FIGURE 9

PHONE NUMBER RECOGNITION

RELATED APPLICATION(S)

This application is a continuation of U.S. application Ser. No. 11/416,378, filed on May 2, 2006. The entire teachings of the above application(s) are incorporated herein by reference.

FIELD OF THE INVENTION

The present invention relates to a system and method for phone number recognition. The phrase "phone number" encompasses any numerical or alphanumeric sequences which can be used to instigate a communication between two end-users and includes within its ambit fax numbers.

BACKGROUND OF THE INVENTION

The primary purpose of phone number recognition components is to recognise a phone number in a piece of text and identify it as such. Further enhancements include being able to use that phone number to make a call, which may involve cleaning up the format of the recognised phone number to put it into a proper format taking into account country codes etc to be able to make the call. Phone number recognition can be used in the context of a peer to peer telephone system of the type described in WO 2005/009019. In this system, a plurality of end users can be connected for communication purposes via a communications structure. The communications structure is substantially decentralised with regard to communication route switching therein for connecting the end users. That is, the end users can establish their own communication routes through the structure based an exchange of one or more authorisation certificates (user identity certificates—UIC) to acquire access to the structure. The structure includes an administration arrangement issuing the certificates to the end users. One such phone system exists under the trade name SKYPE™.

Phone number recognition can be used in other contexts. Automated recognition of phone numbers in a piece of text is not a simple matter. The text may include various numerical or alphanumeric sequences which are not phone or fax numbers. It is important that any automated phone number recognition component is capable of correctly identifying only phone numbers. Moreover, if the phone number is to be used for calling, it is necessary to further identify the location of the caller, the location of the phone number to be called and the necessary country codings to be used to put the phone number into a proper format for making a call.

SUMMARY OF INVENTION

According to an aspect of the present invention there is provided a method of recognising a numeric or alphanumeric sequence of characters in a document, said sequence conforming to predetermined rules, and representing user identifiers for identifying users in a communications system, the method comprising identifying a country of origin of the document; recalling rules relating to the format of said sequence associated with the determined country of origin; searching the document to identify any sequence in the document satisfying said format; and returning any such sequence.

The document can be a any text, for example a web page located by a web browser on the world wide web, an Office document, an email or a PDF file etc.

Another aspect of the invention provides a method of initiating a communication via a communication network, the method comprising: marking in a document at least one sequence representing a communication identifier, the step of marking comprising associating said identifier with a button displayed to a user; actuating the button at a user interface of a user terminal; and executing a client installed at the user terminal to receive said identifier and instigate the communication via the communication network using the identifier.

A further aspect of the invention provides a system for recognising a numeric or alphanumeric sequence of characters in a document, said sequence conforming to predetermined rules and representing user identifiers for identifying users in a communications system, the system comprising a component for identifying a country of origin of the document: a store holding rules relating to the format of said sequence associated with the different countries; a search component arranged to search the document to identify any sequence in the document satisfying a format for the determined country of origin; and a tool for instantiating an object for returning any such sequence.

A still further aspect of the invention provides a computer readable medium comprising computer code components which, when executed by a computer into which the computer medium is installed, implement the following method steps: identifying a country of origin of a document; recalling rules relating to the format of a sequence of numeric or alphanumeric characters associated with the determined country of origin; searching the document to identify any sequence in the document satisfying said format; and returning any such sequence.

A still further aspect of the invention provides a method of effecting a voice communication between user terminals over a communication network, the method comprising: displaying to a user at a user interface a menu of country options: selecting a country of a destination of the communication from said country options; receiving a number in local form; recalling formatting rules for the destination country; appending to the number a country prefix for the country of destination in accordance with the formatting rules to generate a formatted number; and supplying the formatted number to a client installed at the user terminal for effecting the voice communication using the formatted number.

In embodiments of the invention, the cost per minute of a call to that phone number can be worked out. Moreover, it can be identified if the phone number is a mobile number.

For a better understanding of the present invention and to show how the same may be carried into effect, reference will now be made by way of example to the accompanying drawings, in which.

DETAILED DESCRIPTION

The invention will be described in the context of a peer-to-peer telephone system of the type described in WO2005/009019. However, it will readily be appreciated that the phone number recognition component described herein can be used in any other context where it is useful to recognise and utilise phone numbers in text (or an image). For example, the phone number recognition component could be used to identify phone numbers in emails or in a list of members or attendees of an organisation.

Figure 1:
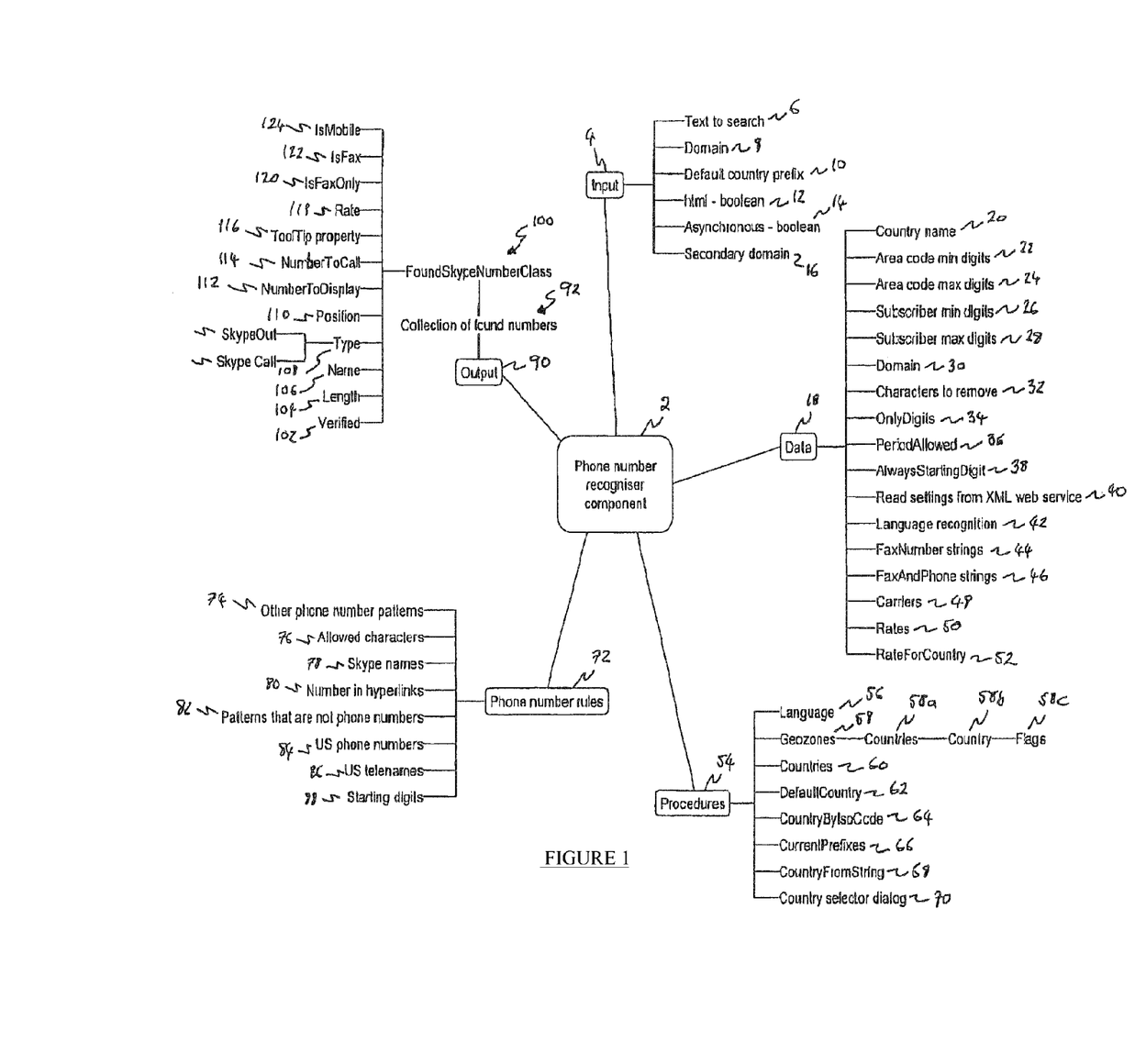
FIG. 1 is a schematic block diagram of elements associated with a phone number recognition (PNR) component.

To implement a peer-to-peer telephone system; client software 300 for making calls is downloaded onto end users' personal computers (PCs) to allow the end users to communicate via the decentralised communications structure such as the Internet or world wide web. The client software is not the subject of this invention and so is not described herein, but it is capable of receiving a phone number for an end user in a standardised format and implementing a call to that user. It also has a registry for holding user names and numbers, so that a name, instead of a number, can be used to instigate a call. Toolbars associated with the client software include a phone number recognition component. FIG. 1 illustrates a phone number recognition component to be launched for example on a toolbar associated with a peer to peer telephone system. The phone number recognition component 2 comprises a program which is executed by the PC when it is launched and which cooperates with a number of elements to generate as an output a collection of phone numbers.

An input element 4 provides a set of inputs including a text to search input 6, a domain input 8, a default country prefix 10, an html-Boolean input 12, an asynchronous-Boolean input 14 and a secondary domain 16.

A data element 18 provides data items to the phone number recognition component 2 in the form of a table (FIG. 6) including for each region a country name 20, minimum digits for an area code 22, maximum digits for an area code 24, minimum digits for a subscriber number 26, maximum digits for a subscriber number 28, domain 30, characters to remove 32, only digit data item 34, period allowed 36 and an always starting digit 38. The data element 18 also provides read settings from XML web service 40, language recognition 42, fax number strings 44, fax and phone strings 46, carriers 48, rates 50 and rate for country 52.

A procedures element 54 provides the following procedures:
 language 56,
 GEO zones 58,
 countries 60,
 default country 62,
 country by ISO code 64,
 current prefixes 66,
 country from string 68,
 country selector dialing 70.

A phone number rules element 72 provides phone number pattern 74, allowed character 76, SKYPE™ names 78, number in hyperlinks 80, patterns that are not phone numbers 82, US phone numbers 84, US tele names 86, starting digits 88.

The phone number recognition component 2 includes an output element 90 which returns a collection of located numbers 92. The numbers have a set of class properties returned in a number class phone object 100 as follows:
 verified 102;
 length 104,
 name 106,
 type (SKYPE out or SKYPE call) 108,
 position 110,
 number to display 112,
 number to call 114,
 tool tip property 116,
 rate 118,
 is fax only 120,
 is fax 122,
 is mobile 124.

Figure 2:
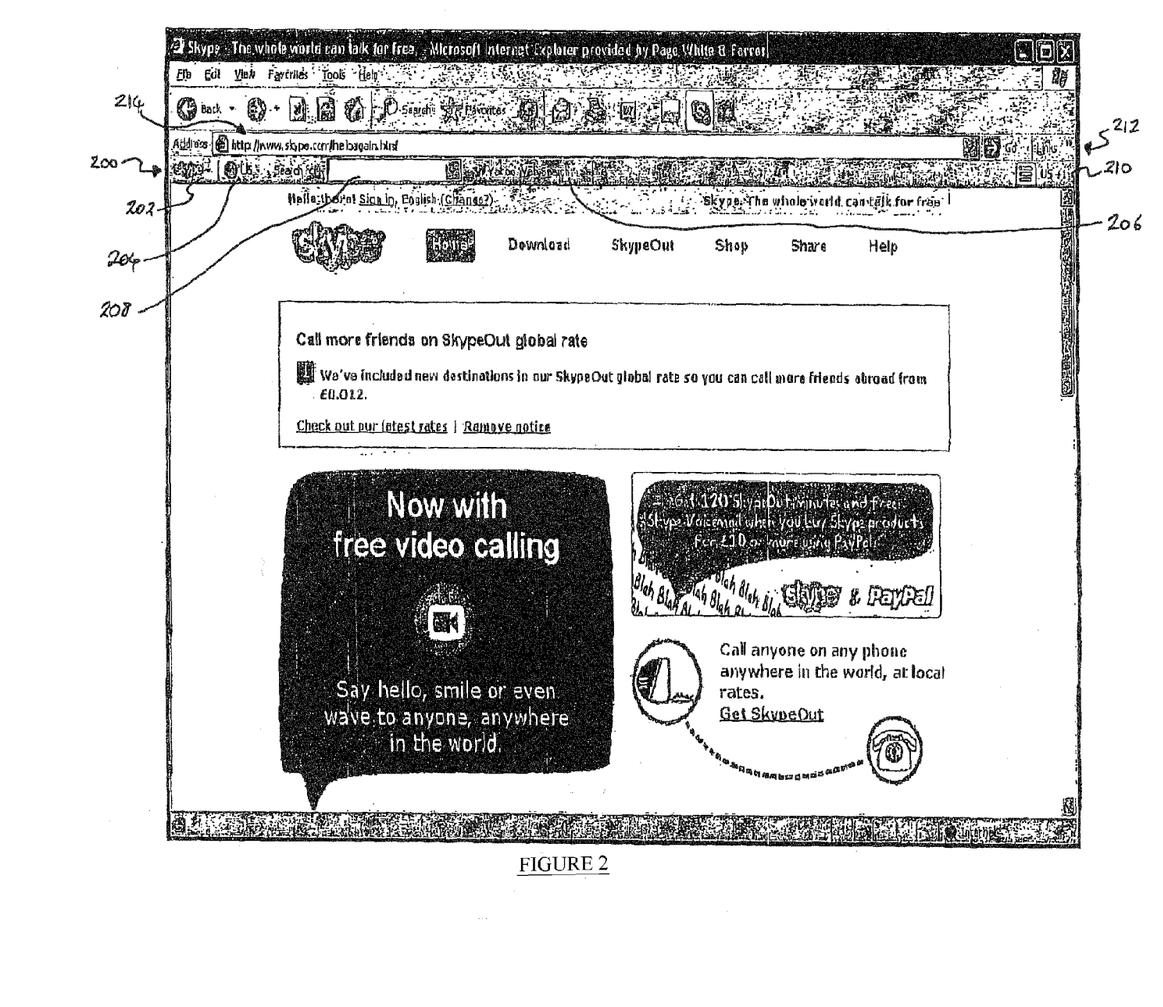
FIGS. 2 to 4 are screen prints showing operation of a toolbar with the PNR components.

Before discussing the above individual elements in detail, the general functionality of the phone number recognition component will be described. FIG. 2 is a screen print showing the SKYPE™ page and specifically a toolbar 200 which provides a SKYPE button 202, a country search button 204, a search domain 206 with an associated search field 208 and a country code button 210.

The SKYPE button 202 provides a menu of options connected with operation of call functionality associated with SKYPE. These are not germane to the present invention and are not discussed further herein.

The country search button 204 provides a menu of options as follows:
 United Kingdom
 United States
 Country Search.

The country search facility will be discussed later in connection with the procedures elements 54. The country code button 210 is likewise linked to a country search facility which will be discussed later. The search domain 206 and search field 208 are not germane to the invention and are not discussed further here. Note that the country code and country search buttons have defaulted to a phone code +1. The default is the country of registration of Windows software if installed on the computer.

The toolbar 200 forms part of a conventional toolbar 212 of a known world wide web explorer such as Microsoft Internet Explorer. That toolbar includes a field 214 for receiving a web address, by means of which a web page can be accessed using a web browser executed on the PC.

Figure 3:
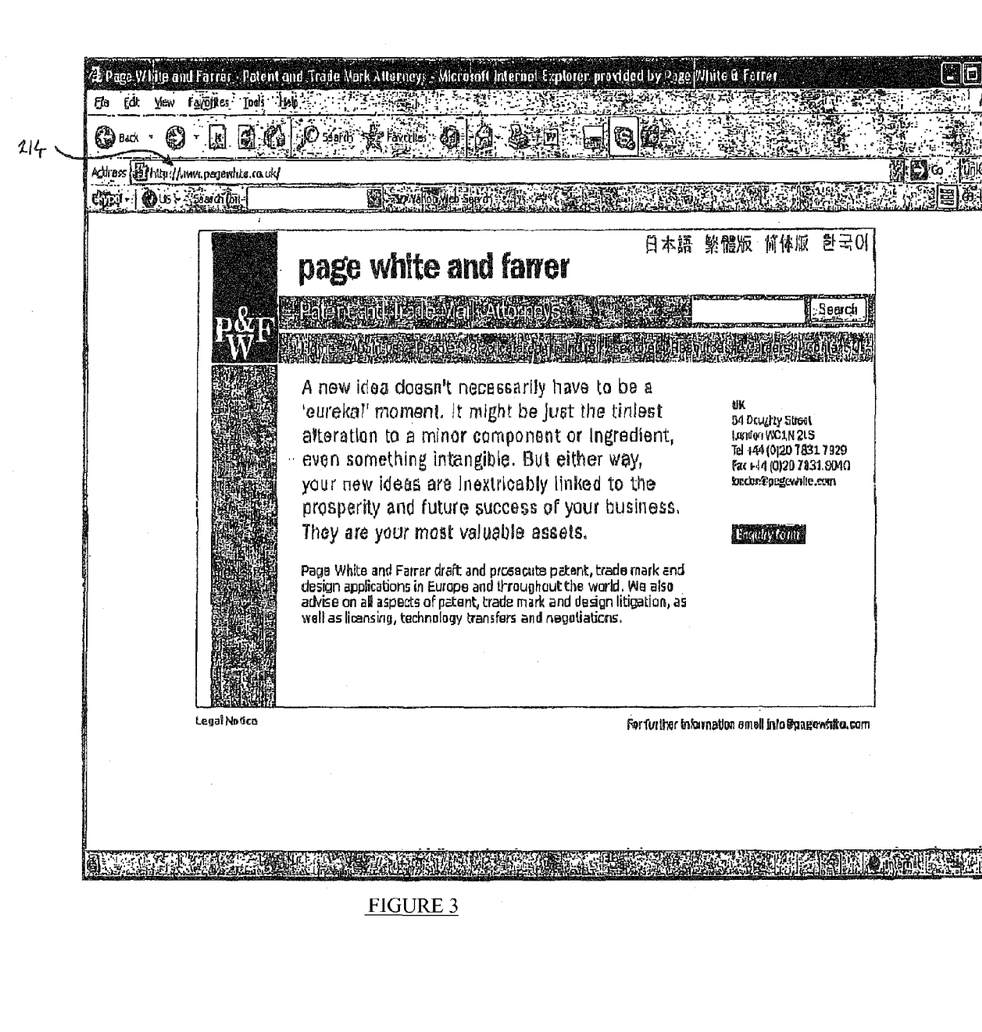
Figure 4:
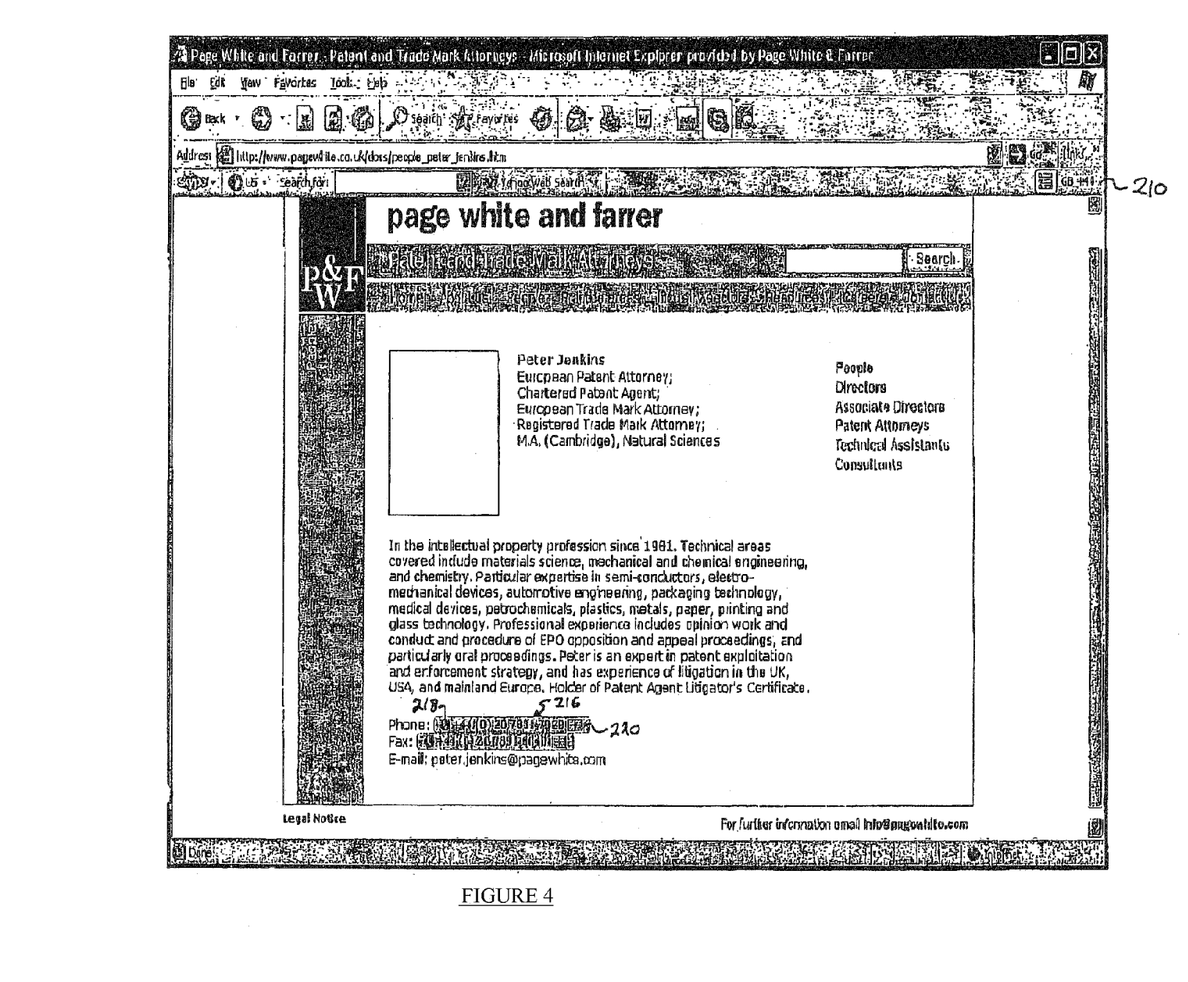

FIG. 3 shows the effect of entering a website address into the field 214 of the main toolbar 212, in this case http://www.pagewhite.co.uk/. This brings up the web page for the firm of European patent attorneys Page White & Farrer. On the home page for the website of Page White & Farrer there are no detectable telephone numbers, but the country of origin of the page is detected as UK, so that the country code button 210 changes to +44. Navigating through the Page White & Farrer website, in particular by clicking on the people icon and selecting one of the directors, leads to a page on which there is an identifiable telephone number 216 as shown in FIG. 4. The detection of the telephone number 216 by the phone number recognition component has a number of effects. The country code button 210 is automatically changed to the country code reflected in the detected telephone number. In this case +44 for GB. A call button 218 is inserted into the web page. In addition, a country logo/flag 220 is inserted indicating the corresponding country for the phone number in this case Great Britain.

If a user activates the call button 218, then a call is instigated through the peer to peer telephone system. This is done by transferring the number to call property 114 of the number class phone object 100 (forming part of the output elements 90) to the local client software 300. By using the input elements 4, data elements 18, procedure elements 54 and phone number rules 72 in a manner to be described more fully later, the number to call property 114 provides the phone number in a format which can be called by the client software 300 without further modification.

Figure 5:
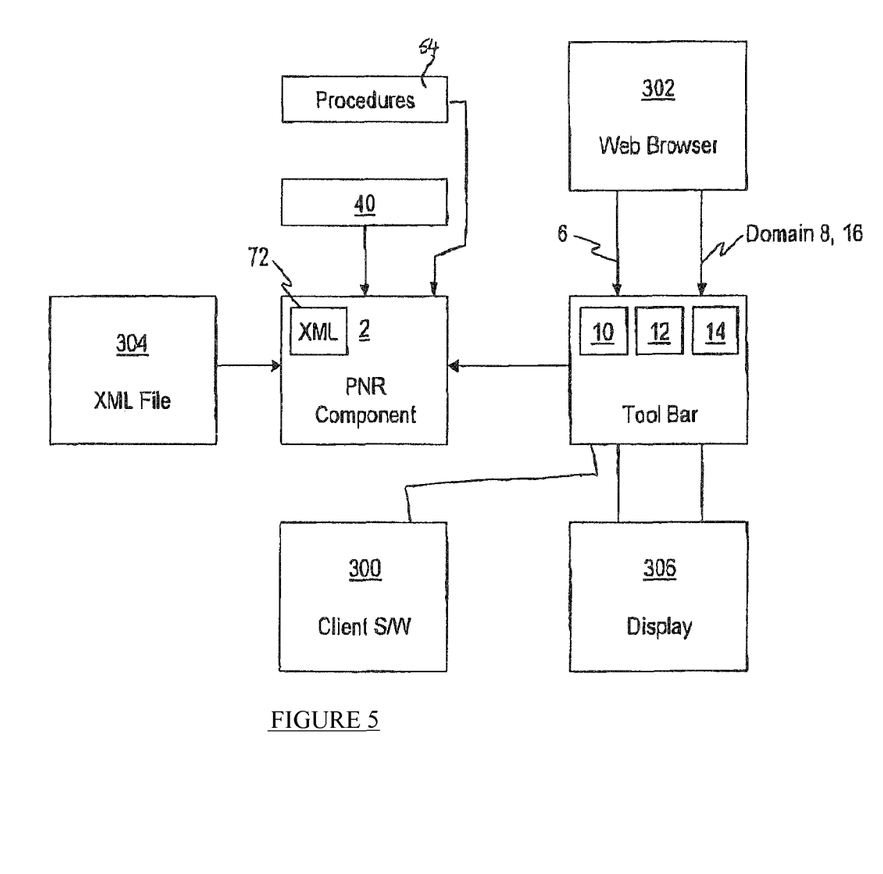
FIG. 5 is a schematic block diagram of components on a user terminal, such as a personal computer.

FIG. 5 is a schematic block diagram of components on a user PC which are used with the phone number recognition component 2. The set of inputs 4 are provided from a web browser 302 to the toolbar 304 and from these to the PNR component 2. The inputs will now be discussed in more detail.

The text to search 6 is input from the web browser 302 and can be in any text format e.g. Unicode, html.

The domain input 8 picks up the domain from the website (e.g. .com, .uk, .se) and if a domain name is specified the PNR component 2 will search in the text only for phone numbers that are in a specified format for the country represented by that domain. The formats are provided in the table in the data elements 18.

A default country prefix 10 can be specified by a user using the country code button 210 to override any automated country identification. If the default country prefix 10 is supplied, only phone numbers are searched which if appended with the prefix would form valid phone numbers according to the phone number rules 72.

The html-Boolean input 12 is set in the toolbar if the text to be searched from the web browser is a html page. In that case, the PNR component 2 searches to see if there is a metatag in the header of the page which identifies the content as SKYPE toolbar parser compatible:

<metaname="SKYPE_TOOLBAR"
    content="SKYPE_TOOLBAR_PARSER_COMPATIBLE"/>

In that case, the text is only parsed for particular constructs as defined below:

```
<!-- sphoneid telnr="+15551234456" fileaz="John Smith" -->
(555) 1234 456
<!-- sphoneid -->.
```

An asynchronous (Boolean) input 14 is set in the toolbar to indicate whether the client software 300 wants to wait for parsing to be done or for the result to be raised as an event.

A secondary domain 16 can be set. A secondary domain is relevant in the context of shared domains. A shared domain is a domain of the world wide web which is not clearly identified as specific to a single country, for example .com, .tv, .nu, .net, .travel, .eu.

If the secondary domain input is specified, the toolbar dispatches two parameters to the SKYPE toolbar 200 as the default domain, the locale domain and the shared domain. The locale domain is taken from local search partners which are displayed (field 206, 208) for a specified country. This information is used as an additional clue when guessing at which country might be appropriate for the current web page. In that case, the toolbar 200 supplies the PNR component 2 with both the shared domain and the local domain. In this case, the PNR component would search for phone numbers in the local format in the current page, and return those in the same collection as the phone numbers for the shared domain page (which are searched without format restrictions).

The data elements 18 are held in an XML file or other resource 304. The data will now be described in more detail.

The country name 20 is the name of the country for which the information applies. The data is held in the form of a table (see FIG. 6) having a list of countries and the data element 22 to 38 associated with each country. This list is also localized in 27 languages. The area code minimum digits 22 is the minimum number of digits allowed in an area code for the country. The area code maximum digits 24 is the maximum number of digits allowed for an area code in the country. Subscriber minimum digits 26 is the minimum number of digits in a subscriber number for that country. The subscriber maximum digits 28 is the maximum number of digits in the subscriber number for that country. The domain 30 is the domain name that goes with that country (for example .se for Sweden).

Figure 6:
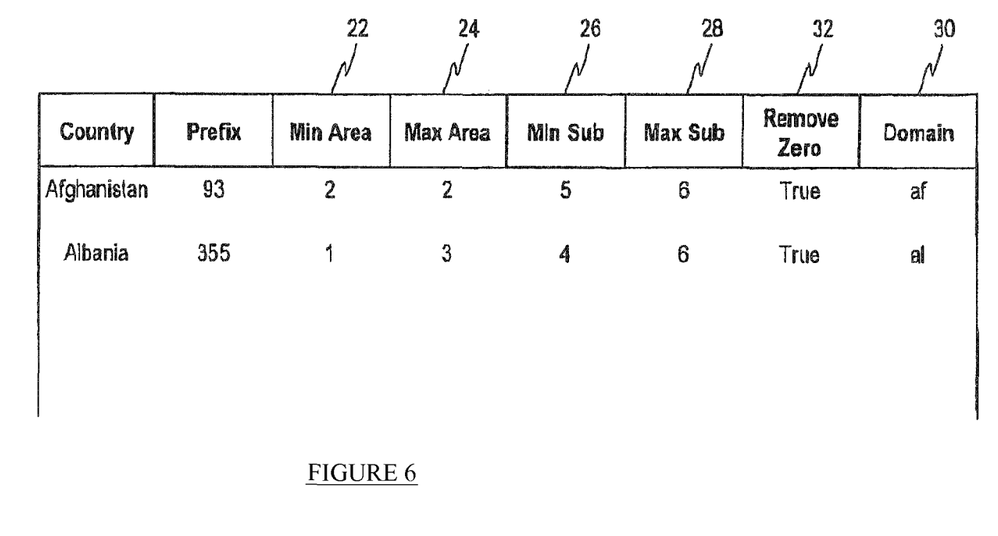
FIG. 6 is table illustrating a country object.

Characters to remove 32 represents a character (usually zero) which is removed when calling internationally.

The only digits data item 34 is a Boolean property which indicates whether only digits are allowed in the phone number. For example US phone numbers are never written like this: +15551231234. Even though it is the correct number of digits it would not be picked up, since it doesn't have any spaces, parenthesis etc.

The period allowed data item 36 is a Boolean value indicating where the periods are allowed as characters within a phone number for the country.

The always starting digit data item 38 is a Boolean Value indicating where the phone numbers for this country should always start with the character which will subsequently be removed, in order to make a properly formatted number.

Although included as part of the data elements 18, the read settings from XML web service 40 is in fact a code sequence which allows the PNR component 2 to check for updates from a web server periodically. This allows as much as possible of the data to be stored on a web server so that patterns and rules can be improved without having to update the local PNR component.

The language recognition data item 42 is a list of phrases which can be used to uniquely identify a text as being from a specific language. For example, for English the phrases could be "and" and "the". In German, the phrases could be "und" and "das".

The fax number strings data item 44, is a property "is fax only" which is set to true if the PNR component 2 determines that a phone number is a fax number. It does this by checking the text that comes immediately before the phone number or in the previous html table cell. If that text is one of the following strings in any language, then the new property "is fax only" is set to true, and an associated property "is fax" is also set to true. Both these values are set false by default.

Fax, telefax, fax number, telefax number.

The fax and phone strings data item 46 is similar in order to identify a number which is for use both as a fax and telephone number. In this case the phrases are fax/tel, telephone and telefax, fax and tel, fax&tel, tel&fax, tel and fax.

If one of these is found, the "is fax only" property should be set to false but the "is fax" property should be sent to true.

The carriers data item 48 is a list of all mobile carriers.

The rates data item 50 is a list of the rates for each carrier. This list can be used to determine the rate for a particular phone number. If the rates are stored on the web server, the read settings component 40 should update them periodically.

The rate for country data item 52 is able to display an appropriate currency for each country.

Reference will now be made to the procedures element 54. The procedures element 54 holds a number of elements which are utilised to determine the most likely country of the web page in which the phone number is to be recognised. These procedures are implemented in the PNR component.

The language procedure 56 allows a default setting language to be obtained from a registry setting within the client software.

The GEO zones collection 56 contains a countries collection 58*a* which in turn contains country objects 58*b* with associated flag objects 58*c*. The country objects expose domain, prefix, phone number, length etc as in the table of FIG. 6. In addition, it gives the localised country name based on the current language setting.

The default country element 62 is a country object that has the same properties as the country object 58*b*. It can be read from the Windows registry setting of the PC and compared to the available list of countries, just in case the user might have Windows set to some country which is not in the list of PNR countries.

The country by ISO code 64 is a property of the country object which identifies the country by its ISO code.

The current prefixes element 64 is a property which returns an array of prefixes, properly prioritised. Again, this is for the shared domain scenarios. If a page is .com the Current Prefixes identify which country codes have been found in the current page. Currently only the first is used in the web toolbars, but the collection could be used to give second and third guesses also. The current prefix property is returned from the input elements 4 and procedures elements 54 using the following priorities:

1. Page language (procedures element 56)—if unique to one country, both if recognised by html language code and if recognised by language recogniser. Inside html the correct language can specified with a special html tag (language code). If this is not properly done, the PNR component runs a language recogniser component which tries to determine which language the text is written in (for some languages). In some cases that gives a clue as to which phone numbers might be written on the current page.
2. Primary domain (input element 8)—if unique to one country.
3. Prefix (input element 10)—if supplied as a parse parameter.
4. Secondary domain (input element 16)—if supplied as a parse parameter.
5. SKYPE language (from procedures element 56)—if unique to one country.

Skype language is used as an additional clue as to what country the current page belongs to. When a client is installed to implement peer-to-peer calling, e.g. Skype, a language setting is used to determine the language of the user. If all the above fails then the Skype language setting is checked. If Skype is in Swedish for example it is more likely that a visit is to a Swedish .com site than to a Japanese site and vice versa.

The following are examples of how the current prefix property will be returned.

Example 1

A user with Swedish locale browse and SKYPE set to Swedish to the page www.datorbutiken.com, which does not have any language set in the html source.
In this case the Current Prefixes property should return:
Prefix(0)=1
Prefix(1)=46

Example 2

A user with Swedish locale browse and SKYPE set to Swedish to the page http://phonebook.livedoor.com/search/?lowflg=1&prefod=13?&typecd=3108000 which does have Japanese setting in the html source.
In this case the Current Prefixes property should return:
Prefix(0)=81
Prefix(1)=46
Prefix(2)=1

Note that 46 is the country code for Sweden, 81 is the country code for Japan and 1 is the country code for the USA (most likely country code for universal or shared domains).

Country from string element 68 finds the country for a specific country name. For example, if the string "Sverige" or "Schweden" is supplied, it returns the country object for Sweden.

Country selector dialogue element 70 uses a map interface for setting the locale if the user wishes to override the locale determined by any the procedures. This uses a map as in FIG. 9 which has drop-down menus for each continent.

The phone number rules 72 are held in an XML file forming part of the PNR component 2. The phone number rules are set up to allow phone numbers to be recognised in the text which is input to the PNR component 2 for searching. If the same number is found multiple times on the same page, only the first occurring instance is returned in the output collection 90.

The following rules are held.

The other phone number patterns rule 74 indicates that the following formats should be accepted and interpreted as a +33 phone number, removing the zero within parentheses.
33(0)155013660.

The allowed characters rule 76 indicates that a phone number to be recognised on a page can contain the following characters (,), /, \, space, dot.

If the text being searched is in html format, the text can also contain line breaks and carriage returns. In non-html, those characters can never be part of a phone number but in html they can. Any other characters inside a number sequence means that this is not a phone number or it is the end of a phone number sequence and the numbers before that should be compared to the rule for the current country.

The SKYPE names rule 78 allows the PNR component 2 to locate call to :// links within the supplied text. These are returned in the phone number class object 100.

The number in hyperlinks rule 80 allows numbers which are not phone numbers but which are located in hyperlinks to be filtered out.

The patterns that are not phone numbers rule 82 indicates that the following common number sequence should never be identified as phone numbers:
IP-numbers,
date and time formats,
a number with only one parentheses and not both,
appearance of parentheses characters in the subscriber number part of a number sequence,
ISBN numbers.

The US phone numbers rule 86 allows the specific US format to be picked up:
1 703 XXX XXXX.

The US tele names rule 86 supports the recognition of US phone numbers containing letters on the assumption that all numbers begin with 1 800 followed by capital letters.

The starting digits rule 88 applies to the leading character of a phone number. In most countries which have a leading character, usually zero, that character is always written when the number is written in local format. For those countries, if the leading character is not present, the number sequence is not a phone number. However in some countries the zero is not always written.

The outputs 90 will now be described. The outputs can be returned either synchronously or asynchronously and are in a collection class object 100 or an XML file or a low level C++ struct, with the following properties.

The properties of the class displayed in each phone number object are explained below.

Is mobile is a Boolean property which is false by a default and true if found in the list of mobile characters. Each mobile carrier is assigned certain numbers so it is possible to identify whether or not a number is a mobile number by comparing with the assigned numbers.

The fax property 122 is a Boolean property which indicates that a number can be used for sending faxes. The number could also be used to make phone calls.

The fax only property 120 indicates that this number can only be used to receive faxes.

The rate property 118 indicates the rate of the phone call to this number.

A tool tip property 116 is a string with the following syntax:

call % 1 s using SKYPE in % 2 s (% 3 s/minute),

% 1 s is the phone number (if available the name followed by a phone number) % 2 s is for country name in which the phone number is and % 3 s is the SKYPE out rate for that number. This is a standardised record for the number for the client software 300.

The number to call property 114 is the phone number in the format required by SKYPE to call it.

The number to display property 112 is a localised format of the number for display purposes on display 306 so that the user can recognise it.

The position property 110 is to be used for navigation within the text, to represent the location of the phone number. It is in the form of an offset representing the number of characters from the start of the text to be analysed to locate the phone number. The web toolbar can then place the call button on the page.

The type property 108 indicates what kind of number has been found, that is either a PSTN number (SKYPE out) or a SKYPE name (SKYPE call).

The name property 106 allows the name to be displayed if it is available. The default for this option is the same as the number to display.

The length property 104 is the length of the number as formatted in the page.

The verify property 102 is Boolean value indicating whether the phone number is verified. A verified number can be trusted by the SKYPE calling functionality in a much broader sense and can be dialled directly. Partners are invited to specify in a specific html format which digit sequences are indeed numbers and which are not. If such a specific html format is encountered, the number is considered verified.

Figure 7:
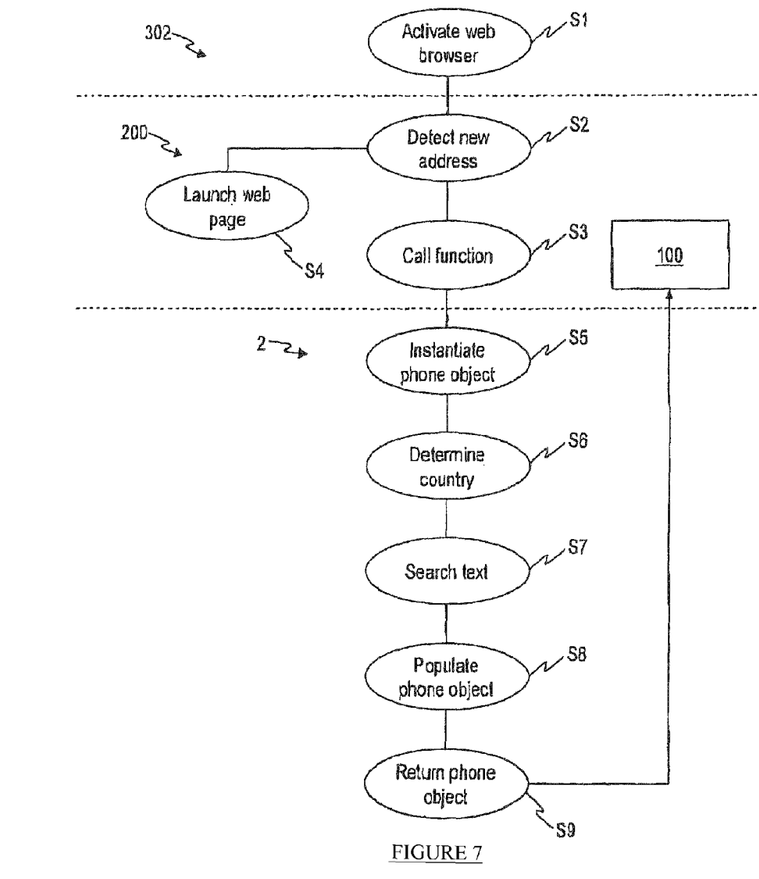
FIG. 7 is a flow chart illustrating in overview the operation of the PNR component.

FIG. 7 is a flow chart illustrating in overview the operation of the PNR components 2. Operations carried out by the web browser 302, the toolbar 200 and the PNR component 2 are shown separated by broken lines. At step s1, the web browser is activated in response to a new address being inserted in the search field 208. The web browser 302 detects the new web address at step s2 and calls the PNR function at step s3, as well as launching the web page at that web address (step s4). Responsive to the function call at step s3, the web toolbar PNR component 2 instantiates a PNR object at step s5 and sends the html of the current page to it. PNR determines the most likely country of origin for the web page at step s6 and then searches the text of the page for any phone numbers at step s7. Step s6 is carried out using the procedures described above to determine the most likely country. One or many of the procedures can be implemented until the country has been established with an appropriate degree of certainty. A user of the PC can override the selection of the country manually by using the country code button in the toolbar 200 after the parsing is done. Searching of the text in step s7 is done using known pattern recognition software to isolate numerical or alphanumeric sequences. Such sequences are then checked to see whether they comply with the rules 72. If any such sequences are located, a phone object is populated at step s8 with the properties described with reference to the phone object 100. The populated phone object is then returned at step s9 to the toolbar 200. It can be recalled from there by the software client 300 in order to call the number, or for display purposes on the display 306. The web toolbar actually changes the html that the web browser displays for the user—adding the call button 218.

Figure 8:
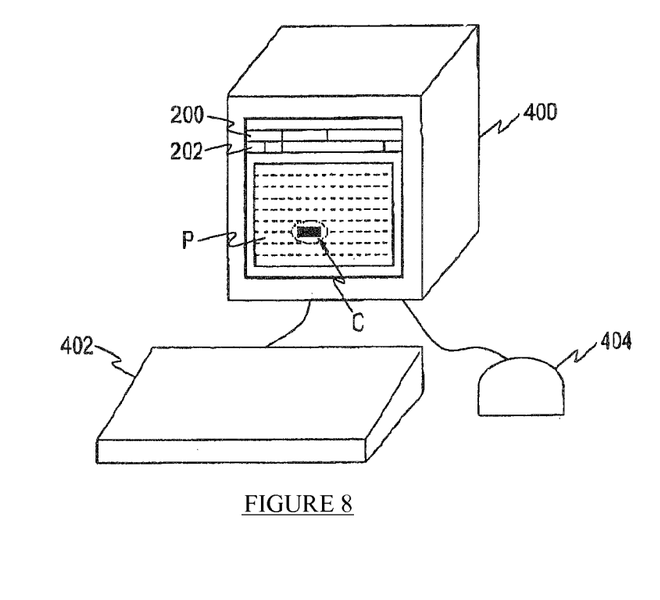
FIG. 8 illustrates a computer system with the click to call functionality.
Figure 9:
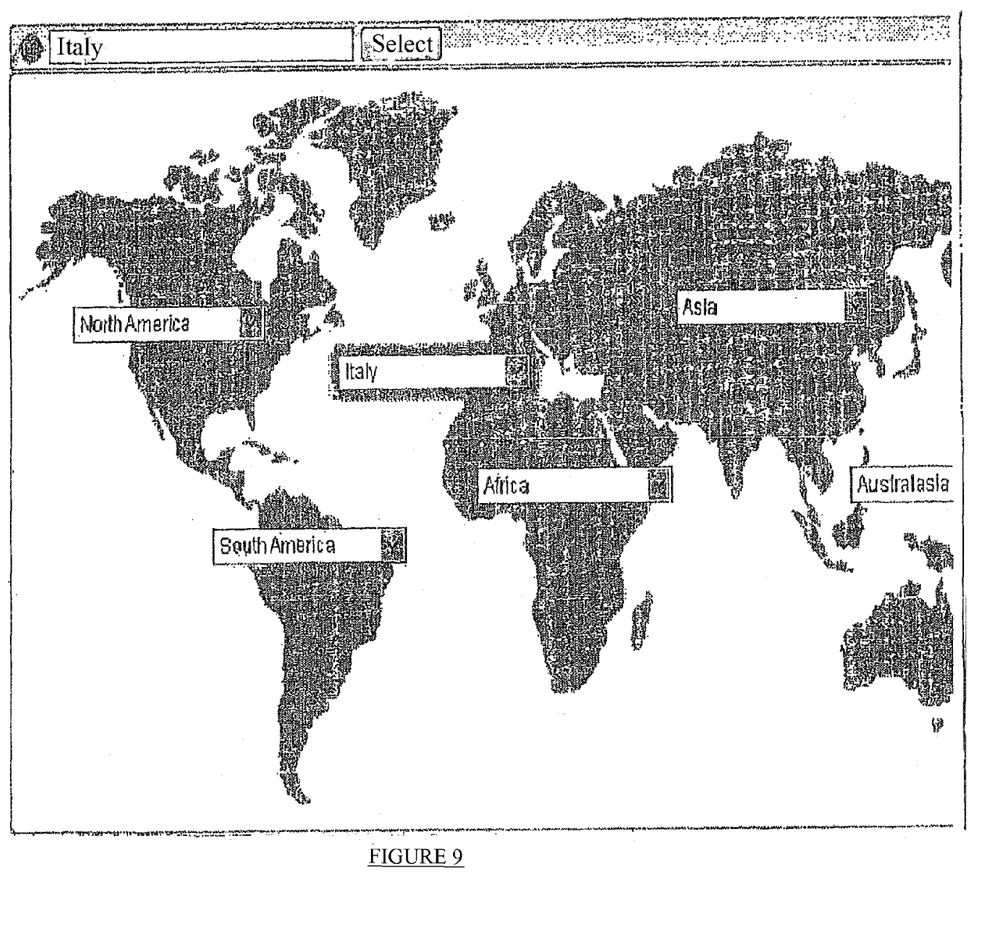
FIG. 9 shows a display for selecting countries.

FIG. 8 illustrates a computer system with the "click to call" functionality demonstrated more clearly. The computer system comprises a terminal 400 associated with a keyboard 402 and another user interface such as a mouse 404. It will be appreciated that any user interface can be used to replace or augment the keyboard 402 and the mouse 404. Reference numerals 200 and 202 denote the explorer toolbar and call toolbar as before. FIG. 9 also illustrates the country search button, country code button and the address fields also denoted by the same numerals. P denotes a page of text displayed on a display 306 of the terminal 400. A cursor C is operated by the user interface, such as the mouse 404, and in this case is shown located over a recognised phone number 216 around which a button 218 has been created. When the user actuates the cursor, for example by clicking the mouse, the phone object 100 associated with that recognised number is passed to the client software 300 in order to instigate a call to the number.

What is claimed is:

1. A method of recognising a numeric or alphanumeric sequence of characters in a document, said sequence conforming to predetermined rules, and representing user identifiers for identifying users in a communications system, the method comprising:

identifying a country of origin of the document, the determined country of origin capable of being changed by a user;

recalling rules relating to a format of said sequence associated with the determined country of origin;

searching the document to identify any sequence in the document satisfying said format;

determining a rate associated with said sequence;

converting said sequence into a call format for the determined country of origin; and returning any such sequence and the determined rate in a currency associated with the determined country of origin.

2. A method according to claim 1, wherein the document comprises a web page, and the method further comprises launching a web browser to locate a web page on a world wide network.

3. A method according to claim 1, wherein the document is selected from the group comprising a Word document, an email and a PDF file or any other text source.

4. A method according to claim 2 further comprising marking said sequence in a displayed version of the page.

5. A method according to claim 1, wherein said sequences represent phone or fax numbers.

6. A method according to claim 4, wherein said sequences represent phone or fax numbers and said marking comprises associating said phone or fax number with a button on a display, said button being actuatable by a user to instigate a call using said number.

7. A method according to claim 1, wherein said determining the country comprises examining the domain of the located page.

8. A method according to claim 1, wherein said determining the country comprises examining the language of text on the page.

9. A method according to claim 8, further comprising examining the language of text on the page by detecting an html language code.

10. A method according to claim 8, wherein said examining the language of text on the page comprises executing a language recogniser component to recognise the language of preselected words in the text on the page.

11. A method according to claim 7, wherein said examining the domain of the located page comprises determining whether or not it is a shared domain, and if it is a shared domain then examining a secondary domain.

12. A method according to claim 1, wherein said determining the country comprises examining language settings of software installed at a user terminal.

13. A method of initiating a communication via a communication network, the method comprising:
marking in a document at least one sequence representing a communication identifier by associating said identifier with a button displayed to a user;
detecting actuation of the button at a user interface of a user terminal;
determining a rate associated with said sequence;
converting said sequence into a call format for a determined country of origin of the document, the determined country of origin determined by examining a plurality of factors associated with the document, a default country of the determined country of origin being a country of registration of software; and
executing a client installed at the user terminal to receive said converted sequence and the determined rate in a currency associated with the determined country of origin, and instigate the communication via the communication network using the converted sequence.

14. A system for recognising a numeric or alphanumeric sequence of characters in a document, said sequence conforming to predetermined rules and representing user identifiers for identifying users in a communications system, the system comprising:
a component for identifying a country of origin of the document, the determined country of origin capable of being changed by a user;
a store holding rules relating to a format of said sequence associated with the different countries;
a search component arranged to search the document to identify any sequence in the document satisfying a format for the determined country of origin;
a component to determine a rate associated with said sequence;
a converter arranged to convert said sequence into a call format for the country of origin of the document identified by the component for identifying; and
a tool for instantiating an object for returning any such sequence and the determined rate in a currency associated with the determined country of origin.

15. A system according to claim 14, which further comprises a web browser arranged to locate a page on a world wide network, said page constituting said document.

16. A system according to claim 14 when implemented on a user terminal, the user terminal further comprising a client for executing a peer-to-peer communication using said user identifier.

17. A system according to claim 16, wherein the converter is arranged to convert said sequence into a call format for use by said client in a peer-to-peer communication.

18. A computing device comprising:
one or more processors; and
one or more computer readable medium comprising computer code components which, when executed by the one or more processors, perform operations comprising:
identifying a country of origin of a document, the determined country of origin capable of being changed by a user;
recalling rules relating to a format of a sequence of numeric or alphanumeric characters associated with the determined country of origin;
searching the document to identify any sequence in the document satisfying said format;
determining a rate associated with said sequence;
converting said sequence into a call format for the determined country of origin; and
returning any such sequence and the determined rate in a currency associated with the determined country of origin.

19. The computing device of claim 18, wherein said identifying the country comprises examining a domain of the document or examining the language of text in the document.

20. The computing device of claim 19, wherein said examining the language of text in the document comprises executing a language recogniser component to recognise the language of preselected words in the text in the document.

\* \* \* \* \*